(No Model.) 5 Sheets—Sheet 1.
D. C. SWEET & F. ALLISON.
MACHINE FOR MAKING CUT NAILS.
No. 375,302. Patented Dec. 20, 1887.
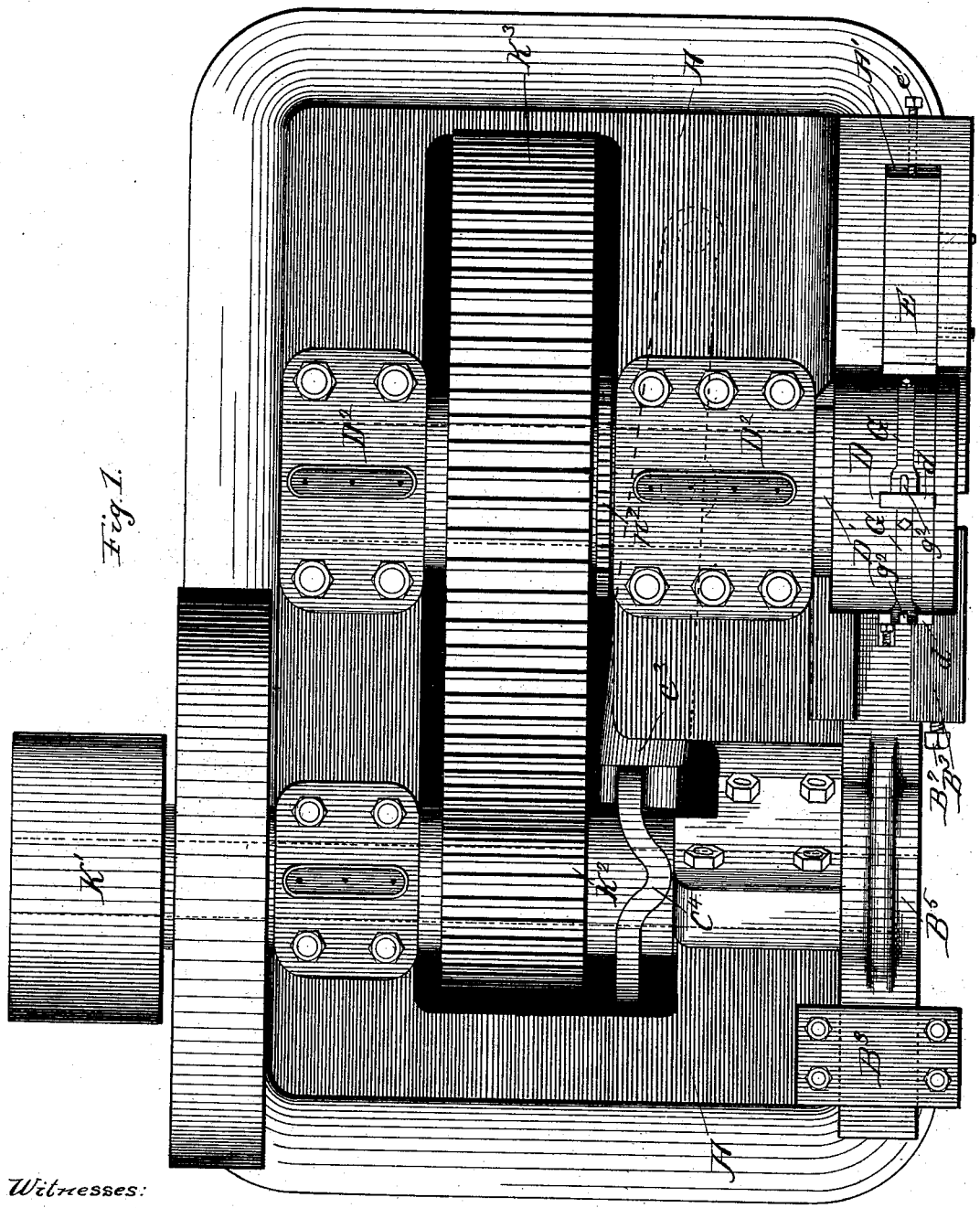
Witnesses:
Lew. E. Curtis
H. M. Munday
Inventors:
David C. Sweet
Frank Allison.
By Munday, Evarts and Adcock
Their Attorneys.

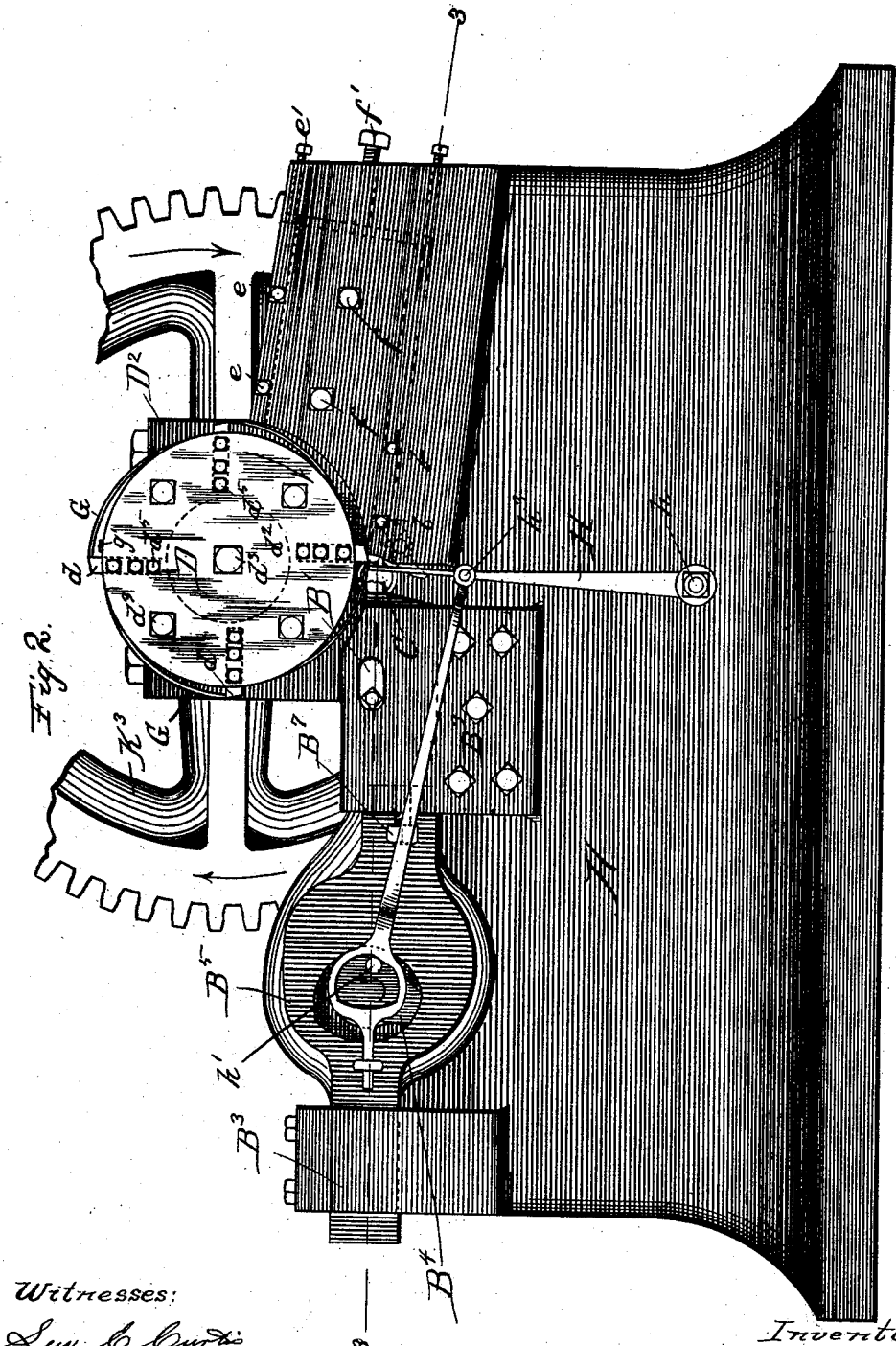

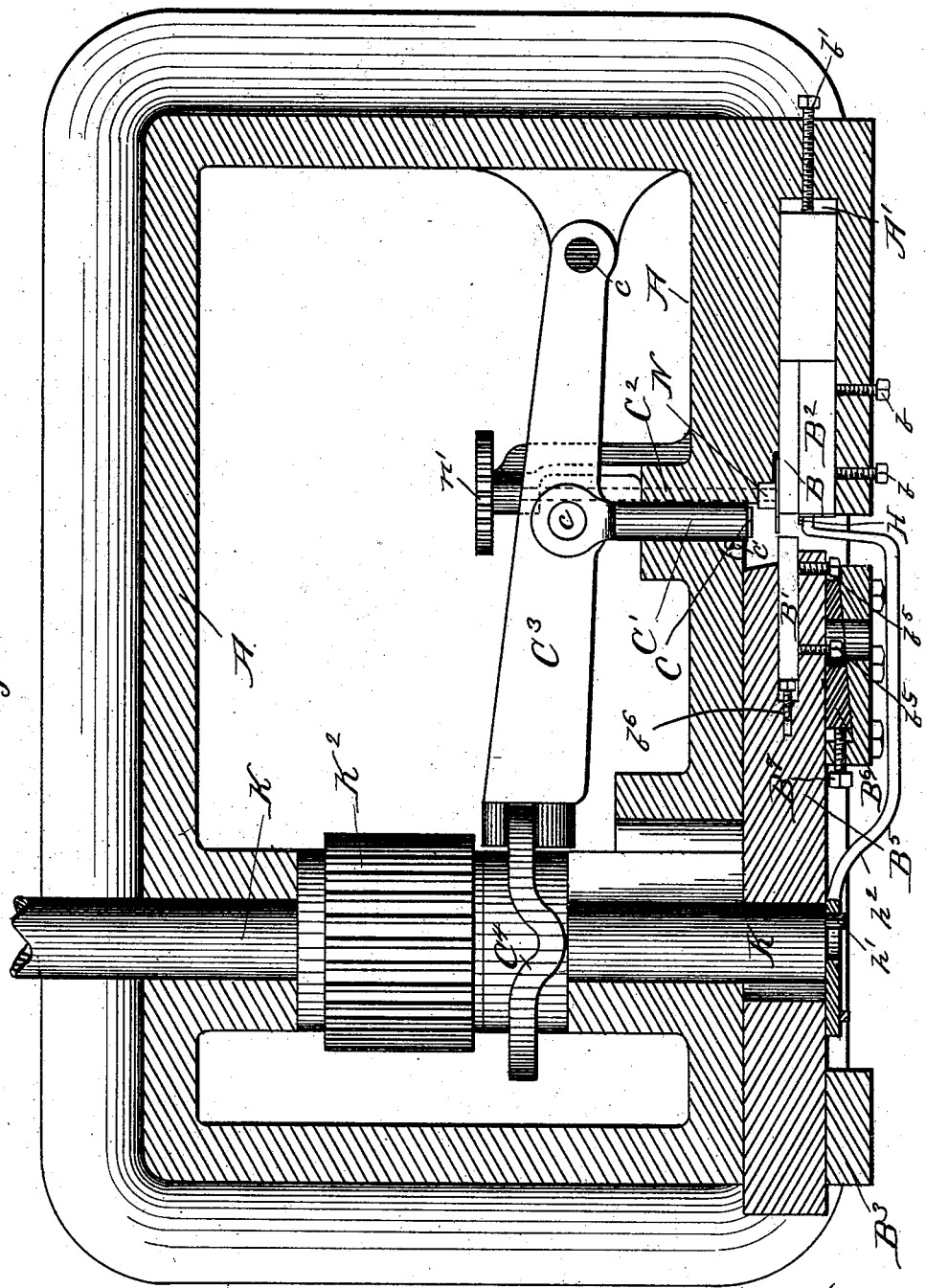

(No Model.) 5 Sheets—Sheet 4.
D. C. SWEET & F. ALLISON.
MACHINE FOR MAKING CUT NAILS.
No. 375,302. Patented Dec. 20, 1887.
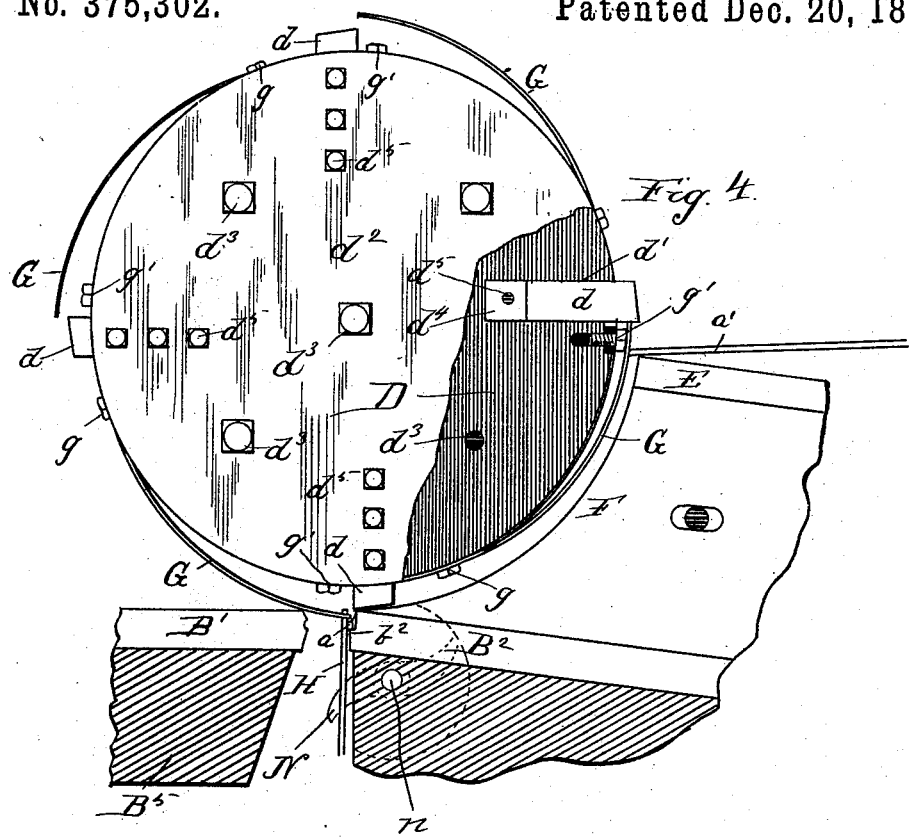
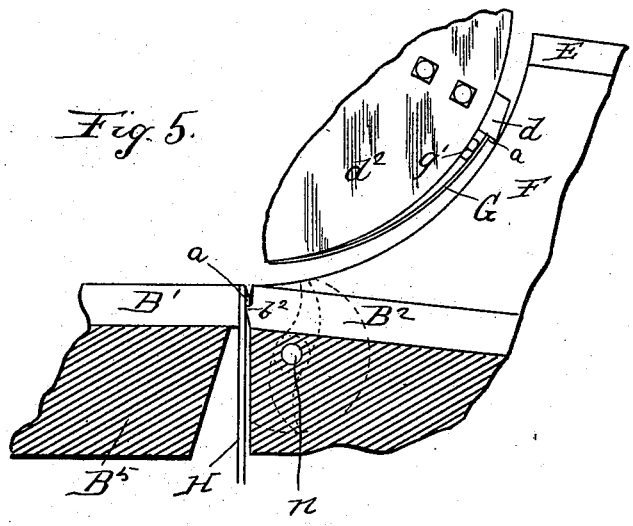
Witnesses:
Lew. E. Curtis.
H. W. Munday.
Inventors:
David C. Sweet.
Frank Allison.
By Munday, Evarts and Adcock
their Attorneys.

(No Model.) 5 Sheets—Sheet 5.
D. C. SWEET & F. ALLISON.
MACHINE FOR MAKING CUT NAILS.
No. 375,302. Patented Dec. 20, 1887.
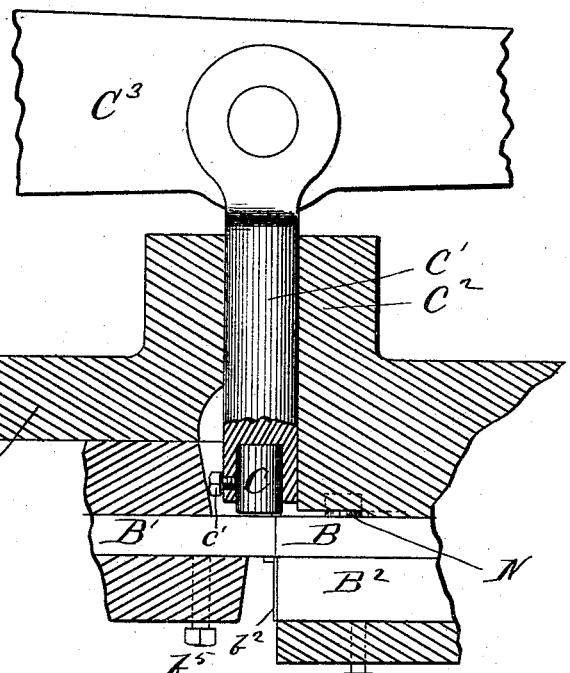
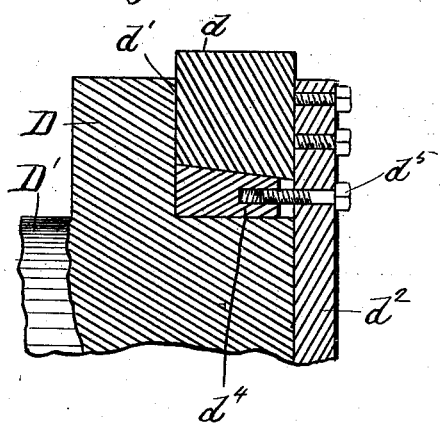
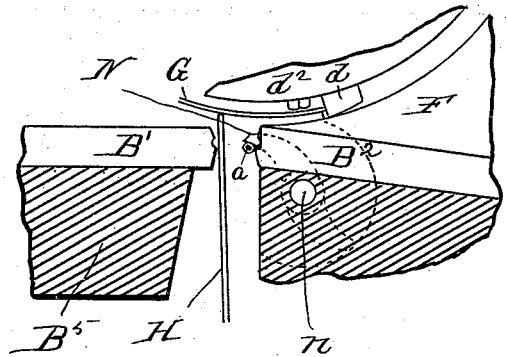
Witnesses:
Lew. C. Curtis.
H. W. Munday
Inventors:
David C. Sweet.
Frank Allison.
By Munday, Evarts and Adcock
their Attorneys.

UNITED STATES PATENT OFFICE.

DAVID C. SWEET, OF CUMMINGS, AND FRANK ALLISON, OF GRAND CROSSING, ASSIGNORS TO THE SWEET & ALLISON MANUFACTURING COMPANY, OF CHICAGO, ILLINOIS.

MACHINE FOR MAKING CUT NAILS.

SPECIFICATION forming part of Letters Patent No. 375,302, dated December 20, 1887.

Application filed April 15, 1887. Serial No. 234,868. (No model.)

*To all whom it may concern:*

Be it known that we, DAVID C. SWEET, a citizen of the United States, and a resident of Cummings, in the county of Cook and State of Illinois, and FRANK ALLISON, a citizen of the United States, residing in Grand Crossing, in the county of Cook and State of Illinois, have invented a new and useful Improvement in Nail-Machines, of which the following is a specification.

Our invention relates to machines for making nails, and more particularly cut nails.

The object of the invention is to provide a machine of a simple and durable construction by means of which cut nails may be manufactured much more rapidly and cheaply than heretofore.

To this end our invention consists, in connection with a pair of gripping-dies and a heading tool or die mounted upon the frame of the machine, of a rotary head or disk furnished with one or more cutters or knives which operate in conjunction with an opposing stationary knife to sever the nail-blank from the nail-plate.

It further consists, in connection with the stationary cutter and the gripping-dies, of a curved guide extending from the said cutter to said dies, along which guide or track the nail-blank is carried by the moving cutter on the rotary head.

It further consists, in connection with the rotary head, of a spring-plate carried by said head for holding the severed nail-blank in position as it is being carried by the revolving head from the stationary cutter to the gripping-dies.

It further consists, in connection with the rotary head and its cutters, the curved guide, and the nail-blank-holding spring, of a spring-nipper operating in conjunction with one of the gripping-dies to receive the nail-blank and to hold the same until it is grasped between the dies.

It further consists, in connection with the gripping-dies and the nipper, of an ejecting device for discharging the finished nail from the die.

It also consists in the novel devices and novel combinations of devices or parts herein shown and described, and more particularly pointed out in the claims.

In the accompanying drawings, which form a part of this specification, and in which similar letters of reference indicate like parts, we have shown one form of machine embodying the principle of our invention, the same being that which we believe to be the best form of machine for practicing our invention.

In the drawings, Figure 1 is a plan view of the machine. Fig. 2 is a side elevation. Fig. 3 is a horizontal section taken on line 3 3 of Fig. 2. Fig. 4 is an enlarged view of the rotary head, cutters, guide, and dies. Fig. 5 is a similar view showing the gripping-dies closed. Fig. 6 is an enlarged view illustrating the operation of the heading-tool. Fig. 7 shows the position of the nipper at the time of the discharge of the finished nail from the die. Fig. 8 is an enlarged sectional view of the head, showing the means for securing and adjusting the knives or cutters.

In the drawings, A represents the frame of the machine, which may be of any suitable construction.

B B' are the gripping-dies, by which the nail-blank $a$ is firmly held while it is being operated upon by the heading-tool C.

D is a revolving head carrying the knives $d$. The shaft D' of the revolving head or knife-carrier D is journaled in suitable bearings, $D^2$, in the frame A.

E is the stationary knife or cutter, and F represents the curved guide, extending from the knife E to the rear end of the fixed die B.

The die B, the guide-block F, and the cutter E are all secured to the frame of the machine, which may be done in any suitable manner; but we preferably provide the frame A with a pocket or vertical slot, A', in which these three tools or parts are secured, one on top of another. The die B is adjustably fixed in place by set-screws $b$ $b$ and the adjusting-screw $b'$. The guide-block F is fixed and adjusted by screws $f$ and $f'$, and the knife E by the screws $e$ and $e'$.

The knife-carrying head D is preferably circular in form. It may, however, be of other shape, as the revolving knives $d$ will describe a circular path whatever be the form of the revolving head on which they are mounted. The guide F is concentric with the head D or with the path described by the revolving cutters $d$, and said guide is preferably about a quadrant of a circle in length, so that the nail-plate $a'$ may be fed to the machine in an approximately horizontal position and the severed nail-blank, after being conveyed to the lower end of the guide, delivered therefrom in a downward direction to the gripping-dies B B'. The upper or cutting edge of the stationary knife E lies, preferably, in a continuation of the arc of the guide F, and the knife should be ground on such arc. The knives $d$ are secured in radial slots or recesses $d'$ in the carrier-head D by a plate or disk, $d^2$, which is fixed by screws or bolts $d^3$ to the end face of the head D. The knives are adjusted radially, so as to project more or less beyond the periphery of the head D, by means of wedges $d^4$ and adjusting screws $d^5$. The revolving head D may be furnished with any desired number of knives or cutters $d$. The machine shown in the drawings has four, and this we consider to be the preferable number to employ.

The knife carrier or head D is provided with a number of nail-blank holders and nail-blank ejectors, G, one for each knife $d$, and located just in front thereof. These holders or ejectors preferably consist each of a flat steel spring, and are secured at their forward ends to the head D by threaded bolts $g$. The holder-plate G need not be, however, necessarily made of spring metal, as a separate spring—for example, a coil-spring—may be used to press the plate outward and hold the nail-blank in place against the curved guide F, and to eject or deliver the blank from the carrier-head to the dies B B'; or, if desired, the holder and ejector plates G may be actuated positively by appropriate mechanism instead of by springs. The free ends of the spring-plates G rest against the feed-regulating stops or screws $g'$. The nail-plate $a'$ is fed forward against the plate or spring G, so this plate in fact regulates or determines the width or thickness of the nail-blank to be severed from the nail-plate. By adjusting the screw $g'$ in or out the nail-blank will be cut thicker or thinner, as may be desired. We desire it to be distinctly understood that, while a minor feature of our invention consists in this spring-plate G, having these triple functions of holding the nail-blank as it is carried along the guide F to the dies B B', ejecting the nail-blank, and as a feed-stop for the nail-plate, we do not limit ourselves to a plate or spring having such triple functions, as separate devices may be employed for performing each of these functions. For example, the spring-plate may be provided with a slot or recess at its end large enough to fit astride the head of the feed-regulating stop $g'$, so that the nail-plate would abut directly against such stop, in which case the spring G would perform no function in relation to the feeding of the nail-plate.

The free end of the spring G is made forked or furnished with a slot, $g^2$, through which slot the upper end of the nipper H projects, so as to hold the nail-blank as it is ejected by the spring G from the carrier D and knife $d$ when the end of the spring G is carried beyond the guide-block F by the rotary movement of the head D, as clearly indicated in Fig. 4. The gripping-dies B B' grasp the nail for about one-third or one-half its length near its larger end, or the end upon which the head is to be formed. The nipper H fits at the side of the dies B B' and presses the nail-blank near its middle portion against the stationary gripping-die B and the ledge or nail-blank support B², which fits at the side of the die B and serves in a measure as a continuation of such die for the whole length of the nail-blank. The under lip, $b^2$, of the supporting-die B² should project out, however, farther than the die B, and preferably to a distance about equal to the thickness of the nail-blank, or more, so that this ledge will support the nail as it is forced down by the ejecting-spring G and hold it firmly until it is grasped between the dies B B'. The nipper H is pivoted at $h$ to the frame of the machine and is vibrated to open the nipper from the fixed die B when the movable die B' is withdrawn by means of the cam $h'$ on the driving-shaft K and a connecting-rod, $h^2$, which is pivotally connected at $h^3$ to the nipper. The upper end of the nipper above this pivot is or should be a spring or made somewhat elastic, to permit the nipper to yield with the motion of the rotary head D and the nail-blank carried thereon until the nail-blank is freed from the knife $d$ by the ejecting-spring G. The movable gripping-die B' or its slide B⁵ reciprocates in suitable guides, B³, on the frame of the machine, and is actuated by a cam, B⁴, on the shaft K. The shaft K is driven from the pulley K' thereon, and the shaft D' of the revolving head D is driven by a gear, K², on the shaft K, which meshes with gear K³ on the shaft D'.

The heading-tool C, or the slide or pin C', in which it is secured, reciprocates in suitable guides, C², on the frame of the machine, and is operated by a lever, C³, pivoted at $c$ to the frame of the machine, the free end of which lever is actuated by a cam, C⁴, on the driving-shaft K. The supporting die or ledge B², adjoining the die B, is adjustably secured in the same slot or recess, A', in the frame as the die B, and by the set-screws $b\ b$. The movable gripping-die B' is adjusted in its reciprocating cross-head B⁵ by the set-screws $b^5\ b^6$. The wear between the cross-head or slide B⁵ and its guide or slideway B³ may be taken up by the adjustable wedge B⁶, which forms one part or side of the slideway.

B⁷ is the screw for adjusting the wedge B⁶. The heading-tool C is fixed in its reciprocating slide or pin C' by set-screws $c'$. The tool C is preferably arranged, as usual, to strike the projecting end of the nail-blank near the periphery of the tool, so that by turning the tool from time to time in its holder C' different portions of the tool may be used as the striking-surface, and the durability of the tool thus greatly increased.

N is the ejector or device for discharging the finished nail from the machine. It is mounted on a suitable shaft, $n$, and revolves close to the side of the fixed gripping-die B, so as to strike the head of the nail, which projects slightly beyond the dies B B' after the same has been formed by the heading-tool. The nail-discharger N strikes the nail after the heading-tool is withdrawn. The shaft $n$ of the discharger N is revolved by a gear, $n'$, which meshes with a gear, $n^2$, on the shaft D'.

While the perfected machine herein shown and described embraces all of the different features of invention we have described, some of the features of our invention may of course be embodied in machines and used without others.

The nail-plate $a'$ may be fed to the machine and turned or rotated by any suitable automatic nail-plate feeder. As nail-plate feeders are well known to those skilled in the art, and as many different kinds thereof are now being made and are on the market, it is not necessary herein to show or describe the same, as our invention does not pertain thereto.

The automatic nail-plate feeder may be connected and operated in connection with our machine the same as with other nail-machines now in use.

In operation the nail-plate is fed to the machine over the knife E against the spring feed-stop G, which determines the thickness of the nail-blank. The nail-blank is severed from the nail-plate by the revolving knife $d$, carried on the revolving head D. The moment the blank is severed from the nail-plate it is pressed and held by the spring G against the curved guide-block F, and is carried by the knife $d$ to the dies B B'. The instant the nail-blank $a$ is carried beyond the guide-block F by the carrier D and knife $d$ the spring G pushes or ejects the nail-blank from the knife and carrier into the bite of the nipper H and the stationary die B and its adjoining ledge or supporting-die B², by which the nail-blank is held until the movable die B' advances and firmly clamps it. When this is done, the heading-tool C strikes the projecting end of the nail-blank and forms the head, after which the movable die B' recedes, and with it the nipper H, when the rotary discharging device N ejects the nail from the stationary die and from the machine. The head D revolves continuously, and as each knife $d$ thereon passes the stationary knife a blank is severed from the nail-plate and carried to the gripping-dies and heading-tool.

As the guide-block F is in length about a quadrant of a circle, the carrier D, by moving the nail-blank over this quadrant, thus serves to give the nail-blank one-quarter of a turn, so that it is discharged from the carrier D and knife $d$ edgewise downward into the dies B B', and thus grasped flatwise between them.

If desired, the machine may be duplicated by mounting a second rotary head D upon the same shaft and duplicating the gripping-dies and heading-tool. This we contemplate doing in some cases.

We claim—

1. In a nail-machine, the combination of a pair of nail-blank-gripping dies mounted upon the frame of the machine with a stationary knife or cutter and an opposing movable knife or cutter carried upon a revolving head, substantially as specified.

2. The combination, with a revolving cutter, of a pair of nail-blank-gripping dies mounted on the frame of the machine tangentially to the path of said revolving cutter, substantially as specified.

3. The combination of a pair of nail-blank-gripping dies mounted upon the frame of the machine, a stationary cutter, a revolving head carrying an opposing cutter, and a curved guide extending from the stationary cutter to the gripping-dies, substantially as specified.

4. The combination of a pair of nail-blank-gripping dies mounted upon the frame of the machine, a stationary cutter, a revolving head carrying an opposing cutter, and a curved guide extending from the stationary cutter to the gripping-dies, said curved guide being in length about the quadrant of a circle, so that the nail-blank will be given a quarter-turn when delivered to the gripping dies, substantially as specified.

5. The combination of a pair of gripping-dies, a stationary cutter, a revolving head carrying an opposing cutter furnished with a nail-blank holder, as G, and a guide-block, F, substantially as specified.

6. The combination of a pair of gripping-dies, a stationary cutter, a revolving head carrying an opposing cutter, a spring-actuated plate, G, and a curved guide-block, said spring G serving to hold the severed nail-blank in position against said guide and to eject the same from said revolving head and its cutter, substantially as specified.

7. The combination of a revolving head, D, furnished with a series of knives or cutters, $d$, an opposing stationary knife, E, a pair of nail-blank-gripping dies, B B', mounted on the frame of the machine, and a heading-tool, substantially as specified.

8. The combination of a revolving head, D, D, carrying a series of knives or cutters, an opposing stationary knife, a curved guide, and a series of flat springs, G, one for each knife, for holding the nail-blank in place against said curved guide as it is carried by the revolution of said head, substantially as specified.

9. The combination, with a revolving head, D, carrying a series of knives or cutters, an opposing stationary knife, a curved guide, and a series of flat springs, G, one for each knife, for holding the nail-blank in place against said curved guide as it is carried by the revolution of said head, of a pair of gripping-dies mounted upon the frame of the machine, substantially as specified.

10. The combination, with a revolving head, D, carrying a series of knives or cutters, an opposing stationary knife, a curved guide, and a series of flat springs, G, one for each knife, for holding the nail-blank in place against said curved guide as it is carried by the revolution of said head, of a pair of gripping-dies mounted upon the frame of the machine and a nipper, H, to receive the nail-blank from the revolving head and its cutters and hold the same until grasped between said dies, substantially as specified.

11. The combination, with a revolving head, D, carrying a series of knives or cutters, an opposing stationary knife, a curved guide, and a series of flat springs, G, one for each knife, for holding the nail-blank in place against said curved guide as it is carried by the revolution of said head, of a pair of gripping-dies mounted upon the frame of the machine, and a nipper, H, to receive the nail-blank from the revolving head and its cutters and hold the same until grasped between said dies, the stationary die being furnished with a ledge or support, $B^2$, at its side, substantially as specified.

12. The combination, with a revolving head, D, carrying a series of knives or cutters, an opposing stationary knife, a curved guide, and a series of flat springs, G, one for each knife, for holding the nail-blank in place against said curved guide as it is carried by the revolution of said head, of a pair of gripping-dies mounted upon the frame of the machine, a nipper, H, to receive the nail-blank from the revolving head and its cutters and hold the same until grasped between said dies, the stationary die being furnished with a ledge or support, $B^2$, at its side, and a revolving nail-ejector, G, substantially as specified.

13. The combination, with a stationary die, B, furnished with a side ledge or nail-blank-supporting die, $B^2$, of a movable gripping-die, B', guide-block F, stationary knife E, rotating head D, furnished with knife $d$, spring G, and nipper H, substantially as specified.

14. In a nail-machine, the combination, with the frame A, furnished with a slot or recess, A', of the gripping-die B, guide-block F, and fixed knife E, all secured in said recess, substantially as specified.

15. In a nail-machine, the movable die B' and its reciprocating head or slide B, in combination with its guide or slideway furnished with an adjustable wedge for taking up wear, substantially as specified.

16. The combination, with guide-block F and rotary carrier D, of nail-blank holder G, substantially as specified.

17. The combination, with guide-block F and rotary carrier D, of nail-blank holder G, supporting ledge or die $B^2$, and nipper H, substantially as specified.

18. The combination, with guide-block F and rotary carrier D, of nail-blank holder G, supporting ledge or die $B^2$, nipper H, and gripping-dies B B', substantially as specified.

19. The combination, with guide-block F and rotary carrier D, of nail-blank holder G, having slotted or forked end, and nipper H, adapted to project through the slotted end of said holder G, substantially as specified.

20. The combination of stationary cutter E and guide-block F with rotary head D, having cutters $d$, spring-plates G, and feed-regulating stops $g'$, substantially as specified.

DAVID C. SWEET.
FRANK ALLISON.

Witnesses:
H. M. MUNDAY,
EDMUND ADCOCK.